(12) United States Patent
Sekiguchi et al.

(10) Patent No.: US 9,958,027 B2
(45) Date of Patent: May 1, 2018

(54) VIBRATION DAMPING DEVICE

(75) Inventors: Tadashi Sekiguchi, Ashigarakami-gun (JP); Hiroyuki Amano, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 675 days.

(21) Appl. No.: 14/380,178

(22) PCT Filed: Apr. 27, 2012

(86) PCT No.: PCT/JP2012/061376
§ 371 (c)(1),
(2), (4) Date: Aug. 21, 2014

(87) PCT Pub. No.: WO2013/161058
PCT Pub. Date: Oct. 31, 2013

(65) Prior Publication Data
US 2015/0005078 A1 Jan. 1, 2015

(51) Int. Cl.
*F16F 15/123* (2006.01)
*F16F 15/14* (2006.01)
(Continued)

(52) U.S. Cl.
CPC ...... *F16F 15/173* (2013.01); *F16F 15/12353* (2013.01); *F16F 15/145* (2013.01);
(Continued)

(58) Field of Classification Search
CPC .. F16F 9/3207; F16F 15/121; F16F 15/12353; F16F 15/13128;
(Continued)

(56) References Cited

U.S. PATENT DOCUMENTS 2,277,186 A * 3/1942 Thege ................. F16F 15/173
464/180
2,636,399 A * 4/1953 O'Connor ............ F16F 15/173
188/322.5
(Continued)

FOREIGN PATENT DOCUMENTS

DE 2118864 A1 * 10/1972 ............ F16F 15/173
DE 2260318 A1 * 6/1974 ............ F16F 15/173
(Continued)

OTHER PUBLICATIONS

Supplementary European Search Report dated Nov. 24, 2015 in Patent Application No. 12875289.6
(Continued)

*Primary Examiner* — Josh Skroupa
(74) *Attorney, Agent, or Firm* — Oblon, McClelland, Maier & Neustadt, L.L.P.

(57) ABSTRACT

A vibration damping device in which vibration damping performance of a damper having a chamber holding a rolling member is improved. The vibration damping device is adapted to damp vibrations resulting from a pulsation of torque applied to a rotary member by an oscillating motion of a rolling member connected with the rotary member while being allowed to rotate relatively therewith. The vibration damping device is provided with a casing member enclosing the rolling member, and a sealing member that connects the casing member with the rotary member in a manner such that the rotary member is allowed to rotate relatively with the casing member, while preventing oil from entering into an inner space of the casing member where the rolling member is held to oscillate.

10 Claims, 4 Drawing Sheets

(51) Int. Cl.
*F16F 15/173* (2006.01)
*F16H 45/02* (2006.01)

(52) U.S. Cl.
CPC ..... *F16H 45/02* (2013.01); *F16H 2045/0205* (2013.01); *F16H 2045/0263* (2013.01); *F16H 2045/0294* (2013.01)

(58) Field of Classification Search
CPC .. F16F 15/13469; F16F 15/145; F16F 15/165; F16F 15/167; F16F 15/173; F16F 15/223; F16F 15/31; F16F 15/363; F16H 45/02; F16H 2045/0205; F16H 2045/0247; F16H 2045/0263; F16H 2045/0294
USPC ................................................ 464/68.2, 68.3
See application file for complete search history.

(56) References Cited

U.S. PATENT DOCUMENTS

| | | | | |
|---|---|---|---|---|
| 3,552,230 | A | * | 1/1971 | McLean ................ F16F 15/173 188/322.5 |
| 6,280,330 | B1 | * | 8/2001 | Eckel ................... F16F 15/145 464/68.2 |
| 6,345,552 | B1 | * | 2/2002 | Rohrig ................. F16F 15/145 74/574.4 |
| 6,742,412 | B2 | * | 6/2004 | Feldhaus ............... F16F 15/145 464/180 |
| 2010/0242466 | A1 | | 9/2010 | Krause et al. |

FOREIGN PATENT DOCUMENTS

| | | | | |
|---|---|---|---|---|
| DE | 2302784 | A1 | * 7/1974 | ............ F16F 15/173 |
| DE | 2553544 | A1 | * 7/1976 | ............ F16F 15/173 |
| DE | 103 48 725 | A1 | 5/2005 | |
| FR | 1089018 | A | * 3/1955 | ............ F16F 15/173 |
| JP | 58042844 | A | * 3/1983 | ............ F16F 15/173 |
| JP | 2000046114 | A | * 2/2000 | ............ F16F 15/145 |
| JP | 2000-297843 | | 10/2000 | |
| JP | 2011-504987 | | 2/2011 | |
| WO | 2012/049762 | | 4/2012 | |

OTHER PUBLICATIONS

Supplementary European Search Report dated Nov. 24, 2015 in Patent Application No. 12875289.6.
Extended European Search Report dated Nov. 6, 2015 in Patent Application No. 12875289.6.
U.S. Appl. No. 14/362,322, filed Jun. 2, 2014, Amano.
International Search Report dated Jul. 10, 2012 in PCT/JP12/061376 Filed Apr. 27, 2012.

* cited by examiner

VIBRATION DAMPING DEVICE

TECHNICAL FIELD

This invention relates to a vibration damping device for reducing torsional vibrations, and especially to a vibration damping device comprising a rotary member rotated by torque and a rolling member held in the rotary member while being allowed to rotate relatively with the rotary member.

BACKGROUND ART

A rotary member such as a drive shaft, a gear and so on used to transmit a torque from a prime mover to a desired portion or a member is vibrated inevitably by a pulsation of the torque or load, or by a friction. A frequency of the vibration is varied according to rotational speed, and high order vibrations such as secondary vibrations are also generated. Therefore, amplitude of vibrations is widened by resonance. As a result, noise is generated and durability of the rotary member is degraded. An example of a device or mechanism for suppressing such vibrations of equipment for transmitting power by rotation is disclosed in Japanese Patent Laid-Open No. 2011-504987.

Japanese Patent Laid-Open No. 2011-504987 describes a force transmission device which can suppress a pulsation of a torque from the prime mover. The transmission device described therein is comprised of: a lockup clutch which is arranged on a torque converter or a transmission route of a power from a turbine runner of the torque converter; an elastic damper that reduces vibrations by an elastic action of a spring; and a pendulum damper arranged on a rotary member of an output side of the elastic damper. In the force transmission device taught by Japanese Patent Laid-Open No. 2011-504987, the elastic damper and the pendulum damper are arranged in the torque converter and immersed in oil delivered thereto.

Thus, according to the teachings of Japanese Patent Laid-Open No. 2011-504987, those dampers are arranged inside of the torque converter to downsize the force transmission device. However, the torque converter is filled with the oil and a rolling member of the pendulum damper is immersed in the oil. Therefore, number of oscillation of the pendulum damper may be changed by a viscosity resistance of the oil and vibration damping effect may be reduced.

DISCLOSURE OF THE INVENTION

The present invention has been conceived noting the above-explained technical problems, and an object of the present invention is to improve a vibration damping performance of a vibration damping device having a chamber holding a rolling member.

The vibration damping device of the present invention is adapted to damp vibrations resulting from a pulsation of torque applied to a rotary member by an oscillating motion of a rolling member connected with the rotary member while being allowed to rotate relatively therewith. In order to achieve the above-explained objective, according to the present invention, the vibration damping device is comprised of: a casing member enclosing the rolling member; and a sealing member that connects the casing member with the rotary member in a manner such that the rotary member is allowed to rotate relatively with the casing member, while preventing oil from entering into an inner space of the casing member where the rolling member is held to oscillate.

The vibration damping device is further comprised of an elastic member that reduce a phase shift between the rotary member and the casing member rotating relatively with each other.

The casing member is comprised of a pair of plates individually covering each face of the rotary member, and those plates are connected with each other to rotate integrally.

For example, the rotary member is arranged in a hydraulic transmission adapted to transmit power utilizing a flow of fluid, and rotated integrally with a driven member of the hydraulic transmission.

Alternatively, the rotary member may also be arranged in a hydraulic transmission adapted to transmit power utilizing a flow of fluid to be rotated integrally with an output member of a lockup clutch for mechanically transmitting torque inputted to the hydraulic transmission.

Specifically, a torque converter adapted to transmit power utilizing a flow of fluid while amplifying the power inputted thereto may be used as the hydraulic transmission.

Thus, the vibration damping device of the present invention reduce vibrations resulting from a pulsation of torque applied to a rotary member by an oscillating motion of a rolling member connected with the rotary member while being allowed to rotate relatively therewith. According to the present invention, the rolling member is held in the casing member connected with the rotary member though the sealing member while being allowed to rotate relatively, and preventing oil from entering into an inner space of the casing member. Therefore, number of oscillation per rotation of the rolling member will not be changed by viscosity resistance of the oil. That is, vibration damping effect of the vibration damping device will not be degraded by the oil.

As described, the casing member is connected with the rotary member while being allowed to rotate relatively therewith. Therefore, in addition to the above-mentioned advantages, a mass of the casing member is not added to a mass of a member rotated together with the rotary member whose vibrations are damped by the oscillating motion of the rolling member. That is, the mass of the rolling member can be increased relatively with respect to the mass of the rotary member whose vibration is damped by the oscillating motion of the rolling member. For this reason, the vibration damping effect of the oscillating motion of the rolling member can be enhanced.

As also described, the vibration damping device of the present invention is further provided with the elastic member for reducing a phase shift between the rotary member and the casing member rotating relatively with each other so that the casing member is allowed to serve as a mass damper. Therefore, the casing member is allowed to contribute to damp the vibrations of the rotary member.

BEST MODE FOR CARRYING OUT THE INVENTION

Figure 1:
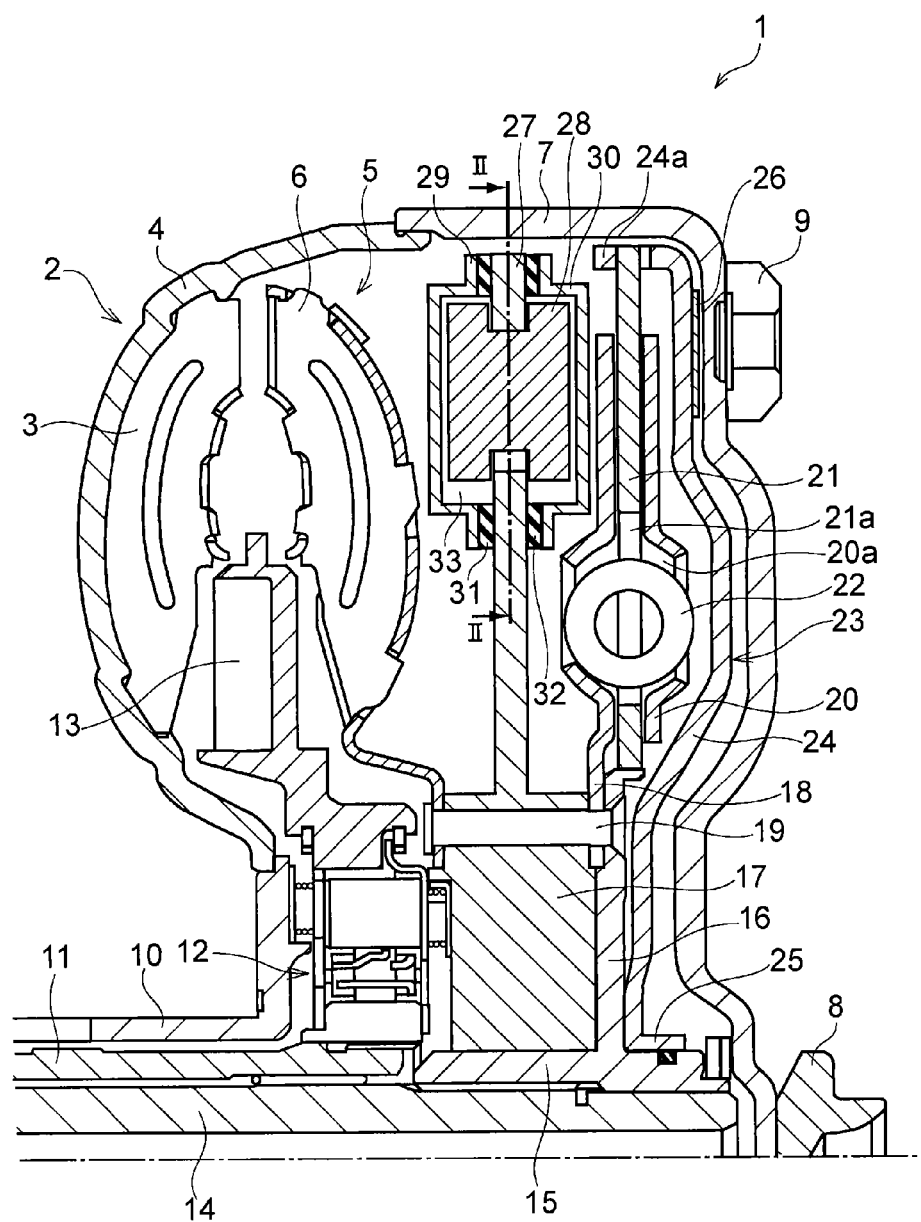
FIG. 1 is a partial sectional view showing upper half of an example of the vibration damping device according to the present invention above a rotational center axis.

Next, a preferred example of the vibration damping device of the present invention will be explained in more detail. Referring now to FIG. 1, there is shown an example in which the vibration damping device is arranged in a torque converter 1 as a hydraulic transmission adapted to amplify a torque. The torque converter 1 shown therein is structured as a conventional torque converter widely used in vehicles. Specifically, a plurality of pump blades 3 is arranged radially on an inner face of a pump shell 4 of a pump impeller 2 as an input side member, and a turbine runner 5 serving as the driven side member of the present invention is arranged to be opposed the pump impeller 2. A configuration of the turbine runner 5 is substantially symmetrically with that of the pump impeller 2, and a plurality of turbine blades 6 is arranged radially on an inner face of an annular (or semitorus-shape) shell. Thus, the pump impeller 2 and the turbine runner 5 are arranged coaxially while being opposed to each other.

A front cover 7 covering the turbine runner 5 from outside is joined integrally with an outer circumferential end of the pump shell 4. As shown in FIG. 1, the front cover 7 is a bottomed-cylindrical member comprising a front wall facing to the inner face of the pump shell 4, and oil is encapsulated inside of the front cover 7. The pump impeller 2 is rotated by the power transmitted thereto, and the turbine runner 5 is rotated to transmit the power by a spiral oil flow in the front cover 7 resulting from rotating the turbine runner 5. A cylindrical member 8 is formed in the center of the front cover 7 to protrude outwardly from the front cover 7, and a not shown output shaft of an engine is inserted into the cylindrical member 8. To this end, the front cover 7 is fixed with a not shown drive plate that is rotated integrally with the output shaft of the engine, at a plurality of outer circumferential portions by a plurality of nuts 9. Therefore, the front cover 7 is rotated together with the drive plate by the power from the output shaft.

A cylindrical shaft 10 is joined integrally with an inner circumferential end of the pump shell 4. The cylindrical shaft 10 extends toward a back side (i.e., toward an opposite side of the engine), and connected with an oil pump not shown. In addition, a fixed shaft 11 is inserted into the cylindrical shaft 10. Specifically, an outer diameter of the fixed shaft 11 is smaller than an inner diameter of the cylindrical shaft 10, and a leading end portion of the fixed shaft 11 is inserted into an inner space of the torque converter 1 enclosed by the pump shell 4 and the front cover 7.

More specifically, the leading end portion of the fixed shaft 11 is situated at an inner circumferential side of the turbine runner 5 between the pump impeller 2 and the turbine runner 5, and splined to an inner race of a one-way clutch 12. In addition, a stator 13 is arranged between an inner circumferential portion of the pump impeller 2 and an inner circumferential portion of the turbine runner 5, and the stator 13 is fitted onto an outer race of the one-way clutch 12. Therefore, provided that a ratio between a speed of the pump impeller 2 and a speed of the turbine runner 5 is small, a rotation of the stator 13 can be stopped by the one-way clutch 12 even if the oil flowing out of the turbine runner 5 acts on the stator 13. As a result, a flowing direction of the oil is changed to a direction to deliver the oil to the pump impeller 2. By contrast, provided that the ratio between the speed of the pump impeller 2 and the speed of the turbine runner 5 becomes large, the oil is poured to a back face of the stator 13. In this situation, therefore, the stator 13 is rotated not to disturb the flow of the oil.

An output shaft 14 (i.e., an input shaft of not shown transmission) is inserted into the fixed shaft 11 in a rotatable manner. A leading end portion of the output shaft 14 protrudes from the leading end of the fixed shaft 11 to the vicinity of an inner face of the front cover 7 so that the protruding portion of the output shaft 14 is splined to a hub shaft 15. On the hub shaft 15, a flange-shaped hub 16 is formed to protrude outwardly, and the turbine runner 5, an after-mentioned holding member 17, and an output plate 18 of a torsional damper are fixed to the hub 16 by a rivet 19. That is, the turbine runner 5, the holding member 17, the output side plate 18 and the hub 16 are integrated in an axial direction by the rivet 19.

According to this preferred example, the output side plate 18 is an annular plate opposed to an annular input side plate 20, and an annular center plate 21 is interposed therebetween. The input side plate 20 is fixed to the output plate 18 by a not shown rivet or bolt, and the center plate 21 interposed therebetween is allowed to rotate relatively with the plates 18 and 20. The center plate 21 is adapted to transmit the power to the output plate 18 and to the input plate 20 though a spring 22. To this end, as shown in FIG. 1, a through hole 21a is formed on the center plate 21, and a clearance 20a for holding the spring 22 is formed between the output plate 18 and the input plate 20 by isolating those plates 18 and 20 from the through hole 21a to expand the clearance therebetween. The spring 22 held in the clearance 20a is allowed to be compressed in the circumferential direction. That is, the spring 22 is compressed when the center plate 21 is rotated relatively with the output plate 18 and the input plate 20. Therefore, according to the preferred example shown in FIG. 1, vibrations resulting from a pulsation of the torque can be damped during transmitting power from the center plate 21 to the output plate 18 and the input plate 20.

A lockup clutch 23 is fitted onto the hub shaft 15 between the hub 16 and the front cover 7. As the conventional lockup clutch, the lockup clutch 23 is adapted to reciprocate in an axial direction depending on a pressure difference between front and rear faces of a piston thereof. Specifically, the lockup clutch 23 is comprised of an annular lockup piston 24, a hub portion 25 formed by bending an inner circumferential portion of the lockup piston 24 toward the engine to be fitted onto the hub shaft 15 while being allowed to rotate relatively with the hub shaft 15, and a friction plate 26 formed on an outer circumferential side of an outer surface of the lockup piston 24 being opposed to the front cover 7. The lockup piston 24 is moved toward the front cover 7 by lowering an oil pressure between the lockup piston 24 and the front cover 7 so that the friction plate 26 is contacted with the inner face of the front cover 7. Consequently, the lockup piston 24 is physically connected with the front cover 7 to transmit the power inputted to the front cover 7 directly to the lockup piston 24.

An outer circumferential portion of the lockup piston 24 is bent toward an output side, that is, toward the hub 16 to form a cylindrical portion 24a, and the cylindrical portion 24a is connected with the center plate 21 through a sleeve. Therefore, the cylindrical portion 24a is allowed to move relatively to the center plate 21 in the axial direction, and to rotate integrally with the center plate 21. The lockup clutch 23 thus structured is engaged under a condition where the vehicle having the torque converter 1 runs at a constant speed so that a speed ratio between an input speed and an output speed of the torque converter 1 is "1".

Figure 2:
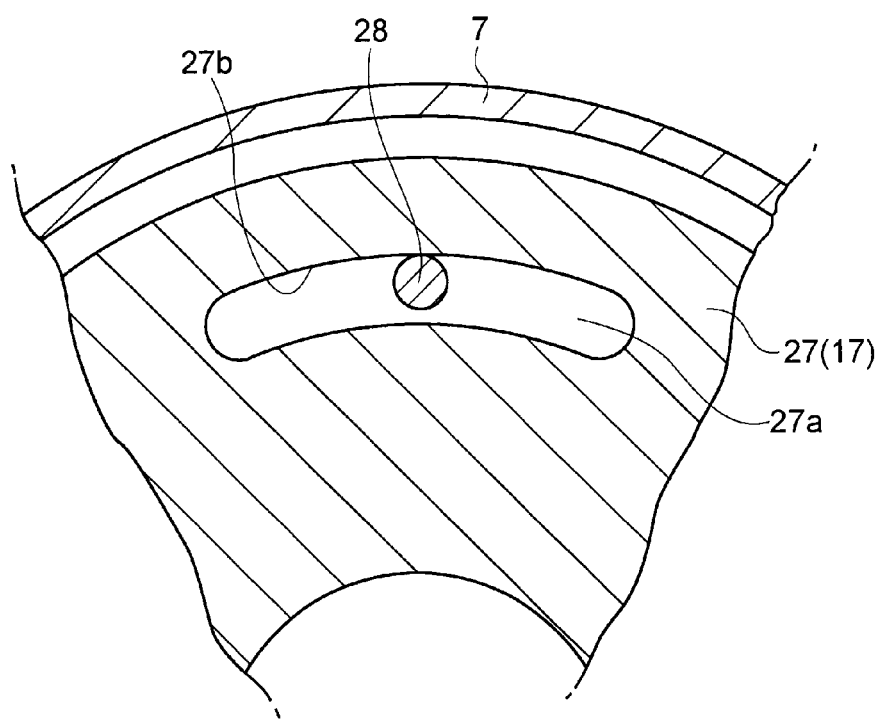
FIG. 2 is a sectional view showing a cross-section along II-II line in FIG. 1.

Specifically, the holding member 17 is formed into an annular member to be fitted onto the hub shaft 15, and connected with the turbine runner 5 and the hub 16. The holding member 17 is comprised of an annular plate 27 for holding a rolling member 28 having a predetermined thickness and extending radially outwardly. In order to enhance the vibration damping effect of the rolling member 28, it is preferable to oscillate the rolling member 28 in the radially outer side of the annular plate 27. To this end, as shown in FIG. 1, the rolling member 28 is situated at the radially outermost portion of the annular plate 27. Specifically, as shown in FIG. 2, an arcuate insertion hole 27a is formed in the radially outer portion of the annular plate 27, and in order to prevent a disengagement of the rolling member 28 in the axial direction, both axial end portions of the rolling member 28 are formed to have outer diameters larger than a width of the insertion hole 27a. In other words, an intermediate portion of the rolling member 28 whose outer diameter is smaller than that of the axial end portion is inserted into the insertion hole 27a.

An inner wall 27b of radially outside in the insertion hole 27a is formed in a manner such that number of oscillation per rotation of the rolling member 28 is adjusted to number of pulsations per rotation of the torque applied to the front cover 7 when the lockup clutch 23 is engaged. To this end, specifically, the inner wall 27b is formed in a manner such that a square root of a value obtained by dividing a distance R from an oscillation center of the rolling member 28 to a rotational center of the hub shaft 15, by a distance L from a gravity center of the rolling member 28 to the oscillation center of the rolling member 28, is equalized to the number of pulsations per rotation "n" of the torque applied to the front cover 7, as expressed by the following equation:

$$n=\sqrt{(R/L)}.$$

Given that the inner wall 27b is formed in such a manner that the number of oscillation per rotation of the rolling member 28 is equalized to the number of pulsations per rotation to be damped, a shape of an inner wall of the insertion hole 27a opposed to the inner wall 27b is not especially limited. As described, according to the preferred example, both axial end portions of the rolling member 28 are formed to have outer diameters larger than a width of the insertion hole 27a to prevent a disengagement of the rolling member 28 in the axial direction. However, a shape of the rolling member 28 is also not especially limited to the shape according to the preferred example if the rolling member 28 is allowed to oscillate along the inner wall 27b. Optionally, in order to allow the rolling member 28 to roll smoothly on the inner wall 27b of the insertion hole 27a, the rolling member 28 may be coated with resin. For this purpose, alternatively, it is also possible to apply grease on a surface of the rolling member 28 or the inner wall 27b.

In order to keep the rolling member 20 in dry condition by protecting from oil, the rolling member 28 is held in a casing. Specifically, as shown in FIG. 1, the insertion hole 27a holding the rolling member 28 therein is covered by bottomed-cylindrical casing members 29 and 30 from both sides. That is, holding spaces of the casing members 29 and 30 are opposed to each other across the annular plate 27 to form a holding chamber 33 enclosing the rolling member 28. Accordingly, the casing members 29 and 30 individually serve as the plate of the present invention. In addition, the casing members 29 and 30 are individually connected with the annular plate 27 through sealing members 31 and 32 so that the casing members 29 and 30 are allowed to rotate relatively with the annular plate 27. That is, the sealing members 31 and 32 not only prevent the oil from entering into the holding chamber 33 from each clearance between the casing member 29 and the annular plate 27 and the casing member 30 and the annular plate 27, but also allow the casing members 29 and 30 to rotate relatively with the annular plate 27. To this end, for example, the sealing members 31 and 32 are individually formed into an accordion-like annular member made of elastic material such as rubber or resin. In the preferred example shown in FIG. 1, each sealing members 31 and 32 is individually bonded or welded to the annular plate 27 or to the casing members 29 or 30.

Thus, according to the preferred example, the rolling member 28 is held in the holding chamber 33 formed by the casing members 29 and 30 so that the number of oscillation per rotation of the rolling member 28 will not be changed by viscosity resistance of the oil. In addition, each casing members 29 and 30 is allowed to rotate relatively with the annular plate 27. This means that the casing members 29 and 30 will not be rotated together with a main vibration system generating vibrations to be damped by oscillating the rolling member 28, that is, a vibration system comprised of the turbine runner 5, the hub shaft 15 the output shaft 14 and the not shown transmission. Therefore, an augmentation of a total mass of the main vibration system can be prevented. That is, a mass of the rolling member with respect to the mass of the main vibration system (i.e., a mass ratio) can be increased so that the vibration damping effect can be enhanced.

As described, each sealing members 31 and 32 is individually made of elastic material having a predetermined elasticity. Therefore, the sealing members 31 and 32 allow the casing members 29 and 30 to rotate relatively with the annular plate 27 while pulling the annular plate 27 in order not to displace the annular plate 27 excessively from the holding chamber 33, that is, to reduce a phase shift between the annular plate 27 and the holding chamber 33. For this reason, the casing members 29 and 30 are also allowed to serve as a mass damper so that the above-mentioned mass ratio can be increased to enhance the vibration damping effect.

Figure 3:
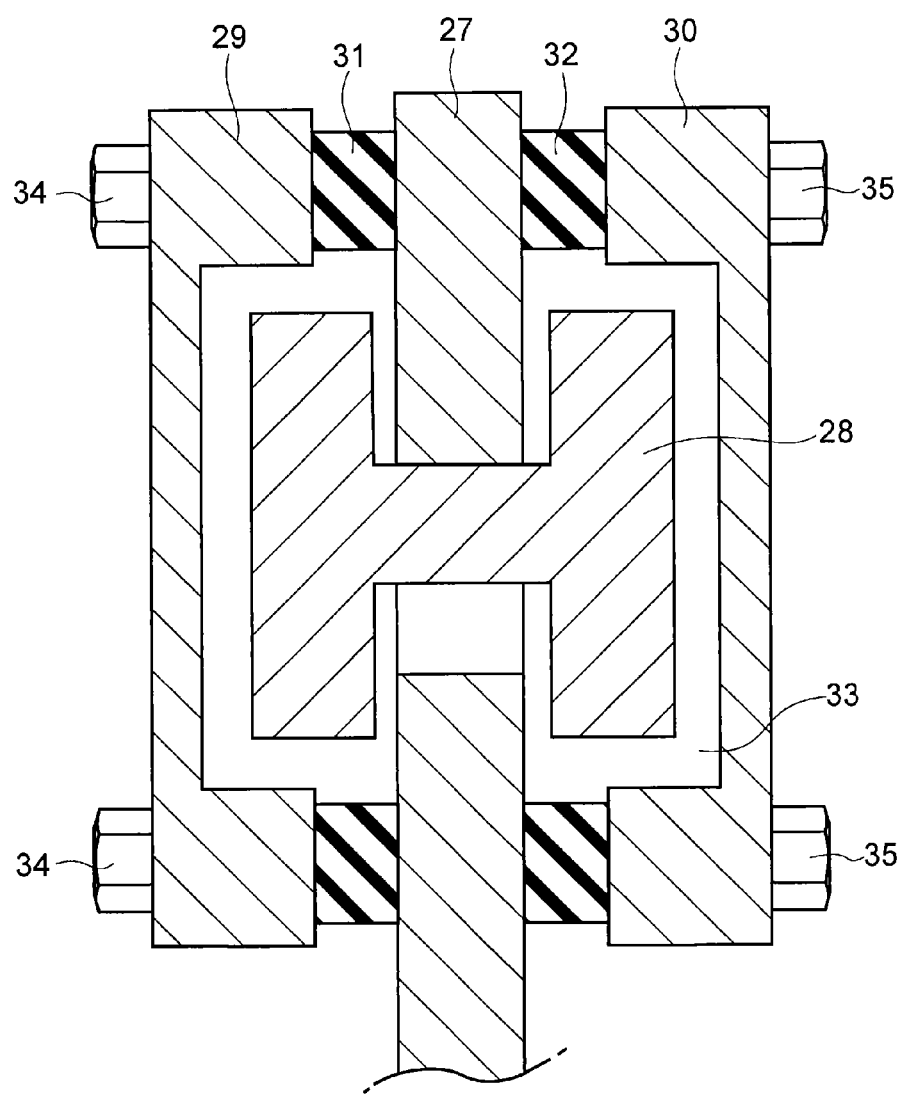
FIG. 3 is a sectional view showing another example of the rolling member.

As also described, according to the preferred example, the sealing members 31 and 32 are bonded or welded to the annular plate 27 and to the casing members 29 or 30. Alternatively, as shown in FIG. 3, the sealing members 31 and 32 may also be attached to the annular plate 27 and to the casing members 29 or 30 by a bolt 34 and a nut 35. Specifically, as shown in FIG. 3, a through hole is individually formed on the casing members 29 and 30, the annular plate 27, and the sealing members 31 and 32, and the bolt 34 is inserted into those through holes. In this case, in order to allow the casing members 29 and 30 to rotate relatively with the annular plate 27 or the sealing members 31 and 32, each through holes formed on the annular plate 27 and the sealing members 31 and 32 has a predetermined length in the circumferential direction. Specifically, the through hole formed on the annular plate 27 has a circumferential length sufficient to avoid a power transmission from the annular plate 27 to the casing members 29 and 30 through the bolt 34 when the casing members 29 and 30 rotate relatively with the annular plate 27. The bolt 34 is inserted into the through holes formed on those members aligned circumferentially in one position from one of the casing members 29 and 30, and the nut 35 is screwed onto an end portion of the bolt 34 from the other casing member 29 or 30 side. Thus, the sealing members 31 and 32 may also be held between the annular plate 27 and to the casing members 29 or 30 using the bolt 34 and the nut 35. In this case, a detachment of the sealing member 31 or 32 from the annular plate 27 or from the casing members 29 or 30 can be prevented even if torque is applied to the annular plate 27 excessively. Therefore, the oil will not enter into the holding chamber 33.

Figure 4:
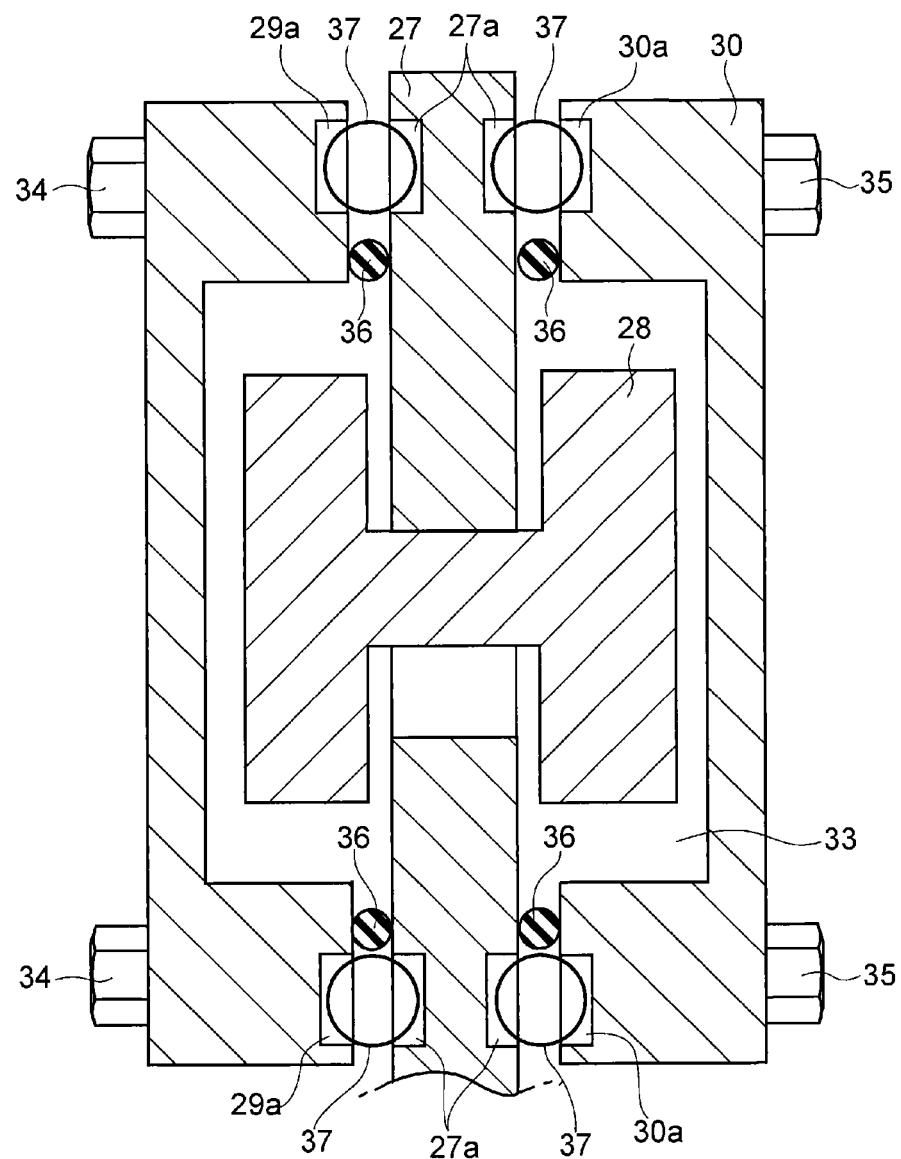
FIG. 4 is a sectional view showing still another example of the rolling member.

According to the foregoing examples, the sealing member is formed of the elastic material to serve not only as a sealing for preventing the oil from entering into the holding chamber but also as a mass damper. However, as shown in FIG. 4, it is also possible to arrange a sealing 36 having only a sealing function and an elastic member such as a spring 37 separately between the annular plate 27 and the casing member 29 or 30. According to the example shown in FIG. 4, a groove 27a having a predetermined circumferential length is formed on each face of the annular plate 27. Meanwhile, another groove 29a having the predetermined circumferential length is formed on the casing member 29 to be opposed to the groove 27a, and another groove 30a having the predetermined circumferential length is formed on the casing member 30 to be opposed to the groove 27a. Consequently, a spring holder is formed on both sides of the annular plate 27, and the spring 37 is held in each spring holder thus formed. Accordingly, when the annular plate 27 is rotated relatively with the casing members 29 and 30, one of the end portions of the spring 37 is pushed by one of the end portions of the groove 27a of the annular plate 27, and other end portion of the spring 37 is pushed by one of the end portions of another groove 29a or 30a of the casing member 29 or 30. That is, in this situation, the annular plate 27 is pushed back by the spring 37 in the direction to reduce a phase shift between the annular plate 27 and the casing members 29 and 30. Therefore, the casing members 29 and 30 are allowed to serve as a mass damper.

According to the example shown in FIG. 4, the sealing 36 such as an O-ring is disposed in an inner circumferential side of the spring 37. That is, the sealing 36 is interposed between the annular plate 27 and the casing member 29 or 30 to seal a clearance therebetween. Therefore, the oil is prevented from entering into the holding chamber 33 by the sealing 36 even if the annular plate 27 is rotated relatively with the casing members 29 and 30. For this reason, the number of oscillation per rotation of the rolling member 28 will not be changed by viscosity resistance of the oil.

The present invention is applied to the hydraulic transmission comprising a driving member and driven member. Therefore, the present invention may also be applied to a hydraulic transmission comprising or a fluid transmission or coupling other than the foregoing torque converter having the torque amplifying function.

The invention claimed is:

1. A vibration damping device, comprising:
   a rotary member to which torque is applied;
   a rolling member connected with the rotary member while being allowed to rotate relatively to the rotary member, the vibration damping device being configured to damp vibrations resulting from a pulsation of torque applied to the rotary member by an oscillating motion of the rolling member;
   a casing member enclosing the rolling member;
   a sealing member that has an elasticity and that is interposed between the casing member and the rotary member in a manner such that the rotary member is allowed to rotate relatively to the casing member, while preventing oil from entering into an inner space of the casing member where the rolling member is held; and
   an elastic member that reduces a phase shift between the rotary member and the casing member rotating relatively to each other.

2. The vibration damping device as claimed in claim 1, wherein the casing member includes a pair of plates individually covering each face of the rotary member; and
   wherein the plates are connected with each other to rotate integrally.

3. The vibration damping device as claimed in claim 2, wherein the rotary member is arranged in a hydraulic transmission adapted to transmit power utilizing a flow of fluid, and rotated integrally with a driven member of the hydraulic transmission.

4. The vibration damping device as claimed in claim 3, wherein the hydraulic transmission includes a torque converter adapted to transmit power utilizing a flow of fluid while amplifying the power inputted thereto.

5. The vibration damping device as claimed in claim 2, wherein the rotary member is arranged in a hydraulic transmission adapted to transmit power utilizing a flow of fluid, and rotated integrally with an output member of a lockup clutch for mechanically transmitting torque inputted to the hydraulic transmission.

6. The vibration damping device as claimed in claim 5, wherein the hydraulic transmission includes a torque converter adapted to transmit power utilizing a flow of fluid while amplifying the power inputted thereto.

7. The vibration damping device as claimed in claim 1, wherein the rotary member is arranged in a hydraulic transmission adapted to transmit power utilizing a flow of fluid, and rotated integrally with a driven member of the hydraulic transmission.

8. The vibration damping device as claimed in claim 7, wherein the hydraulic transmission includes a torque converter adapted to transmit power utilizing a flow of fluid while amplifying the power inputted thereto.

9. The vibration damping device as claimed in claim 1, wherein the rotary member is arranged in a hydraulic transmission adapted to transmit power utilizing a flow of fluid, and rotated integrally with an output member of a lockup clutch for mechanically transmitting torque inputted to the hydraulic transmission.

10. The vibration damping device as claimed in claim 9, wherein the hydraulic transmission includes a torque converter adapted to transmit power utilizing a flow of fluid while amplifying the power inputted thereto.

* * * * *